United States Patent

[11] 3,587,436

| | | |
|---|---|---|
| [72] | Inventor | Robert Nast<br>942 Glenridge Ave., North Woodmere, N.Y. |
| [21] | Appl. No. | 752,382 |
| [22] | Filed | Aug. 13, 1968 |
| [45] | Patented | June 28, 1971 |

[54] FILM FEED APPARATUS
7 Claims, 8 Drawing Figs.

[52] U.S. Cl. ................................................. 95/94,
242/55.53
[51] Int. Cl. ................................................. G03d 3/12
[50] Field of Search ................................................. 95/89, 90.5,
94, 95; 242/55.53; 226/(Inquired);
206/(Inquired); 221/(Inquired); 271/(Inquired);
242/(Inquired)

[56] References Cited
UNITED STATES PATENTS
| | | | | |
|---|---|---|---|---|
| 2,297,525 | 9/1942 | Anheuser ..................... | | 95/90.5X |
| 2,514,853 | 7/1950 | Forgett ......................... | | 95/94 |
| 3,442,195 | 5/1969 | Guynes ......................... | | 95/89 |

Primary Examiner—Samuel S. Matthews
Assistant Examiner—Fred L. Braun
Attorney—Edward F. Levy ABSTRACT: A photographic film feed adapter for simultaneously feeding a plurality of exposed filmstrips to automatic film processing equipment, which includes a tray having its top surface divided into parallel tracks for slidable conveyance of filmstrip therealong from the front to the rear end of the tray, and film roll receptacles at the rear of the tray. A carrier sheet is disposed at the rear end of the conveyor tracks and the leading ends of the filmstrips are detachably secured to the carrier sheet which conveys the filmstrips through the film processing equipment in alignment with the tracks. A reel adapter may be detachably coupled to the front of the tray for accommodating reels of film.

INVENTOR
ROBERT NAST
BY
Edward F. Levy
ATTORNEY

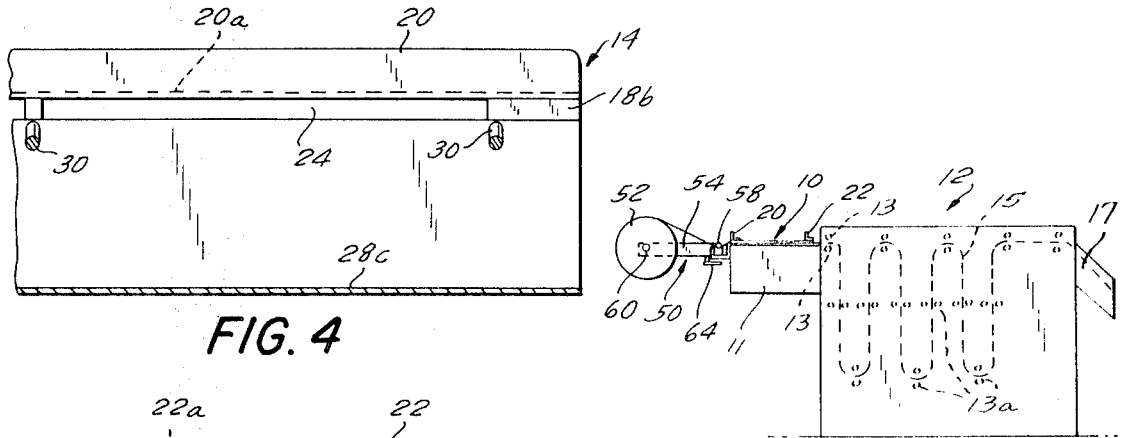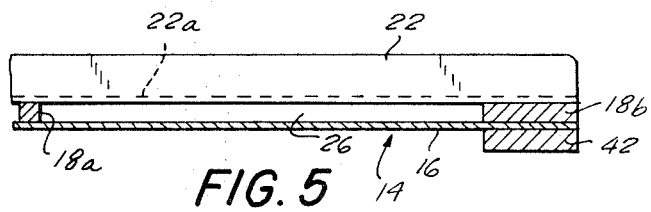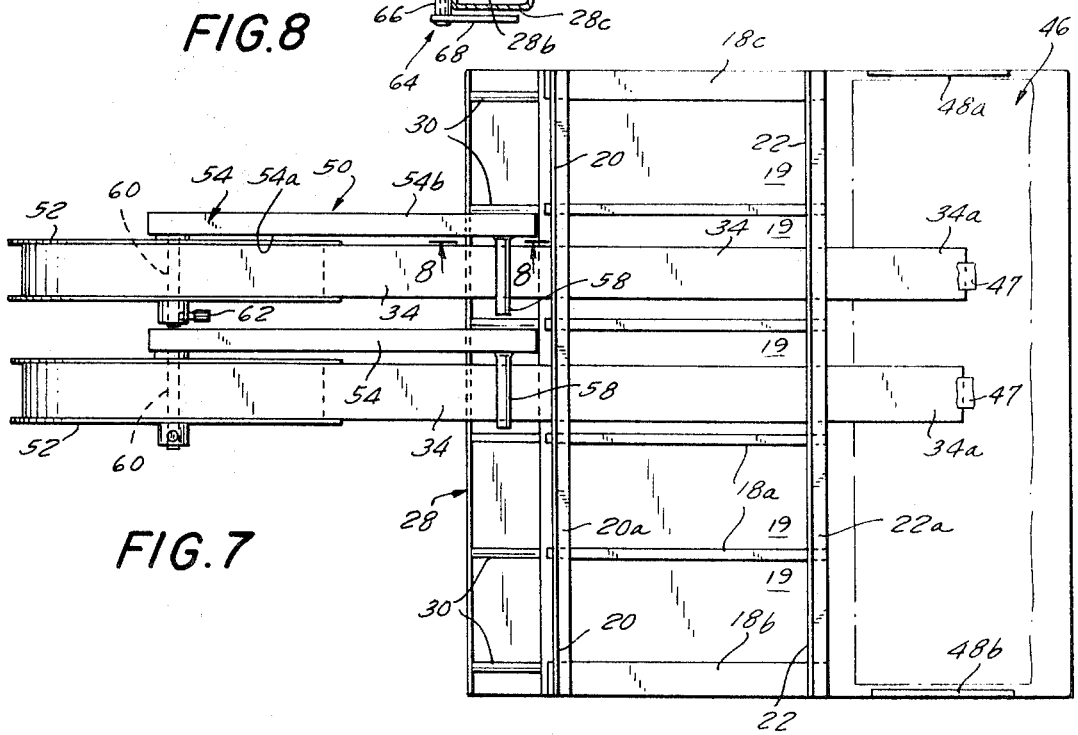

FILM FEED APPARATUS

The present invention relates to apparatus for feeding exposed photographic filmstrips to film processing equipment, and more particularly, to apparatus for simultaneously feeding a plurality of filmstrips to photographic film processing equipment.

Generally, photographic film feed apparatus for conventional automatic photographic film processing equipment is sized to accommodate large sheets of exposed film having widths of about 17 inches. Such currently available roll feed equipment can accept rolls of film of the standard 35mm. size only singly since, in the absence of any guiding means, a plurality of filmstrips placed side-by-side would become skewed and would overlie each other as the filmstrips were conveyed through the various film processing baths such as by means of rollers.

It is therefore an object of the present invention to provide a low cost film feed adapter suitable for attachment to conventional automatic film processing apparatus and operative to feed a plurality of filmstrips simultaneously in a guided straight line path through automatic film processing apparatus.

Another object of the present invention is to provide a film feed adapter in accordance with the preceding object which is operative to simultaneously feed a plurality of film rolls of various widths in guided straight line paths through film processing apparatus.

A further object of the present invention is to provide a film feed adapter in accordance with the preceding objects which is operative to simultaneously feed a plurality of lengths of film mounted on reels in guided straight line paths through film processing equipment.

In accordance with the principles of the present invention there is provided apparatus for feeding filmstrips to film processing equipment comprising a tray having its top surface divided into parallel tracks for slidable conveyance of film strip therealong from the rear to the front end of the tray and means for mounting the tray upon film processing equipment. There is further provided filmstrip receptacle means extending from the rear end of the tray and across the width of the tray for receiving a plurality of filmstrip rolls. Additionally, there is provided carrier sheet means adapted to detachably mount the leading ends of the filmstrips received in the tray receptacles for simultaneously linearly conveying the filmstrips along the parallel tracks and through the film processing equipment.

The features of the invention which are believed to be novel are set forth with particularity in the appended claims. The invention itself, however, both as to its organization and method of operation, together with further objects and features thereof may best be understood with reference to the following description taken in conjunction with the accompanying drawings wherein:

FIG. 4 is an enlarged section taken along line 4-4 of FIG. 2;

FIG. 5 is an enlarged section taken along line 5-5 of FIG. 2;

FIG. 6 is a side elevational view of the film feed apparatus of FIG. 1 modified to include a reel adapter suitable for handling roll film of greater length, the film feed apparatus being shown mounted on a film processing machine;

FIG. 7 is an enlarged top plan view of the modified film feed apparatus of FIG. 6; and FIG. 8 is a section taken along line 8-8 of FIG. 7.

Figure 1:
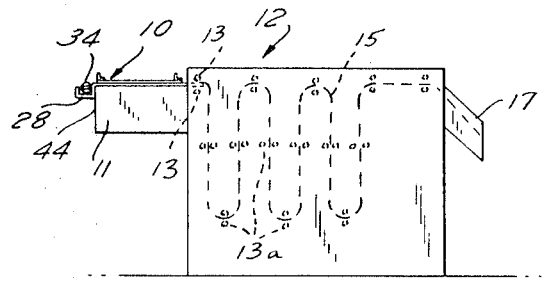
FIG. 1 is a side elevational view of a film feed apparatus constructed in accordance with the principles of the present invention, shown mounted upon an automatic film processing machine.
Figure 2:
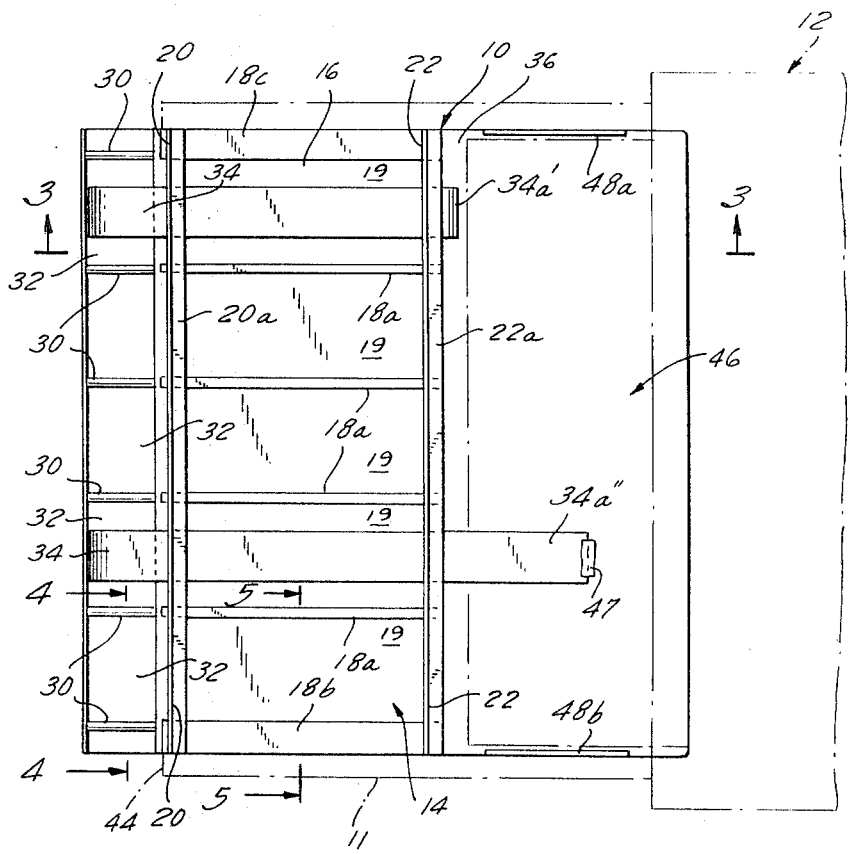
FIG. 2 is a top plan view on an enlarged scale, of the film feed apparatus of FIG. 1.
Figure 3:
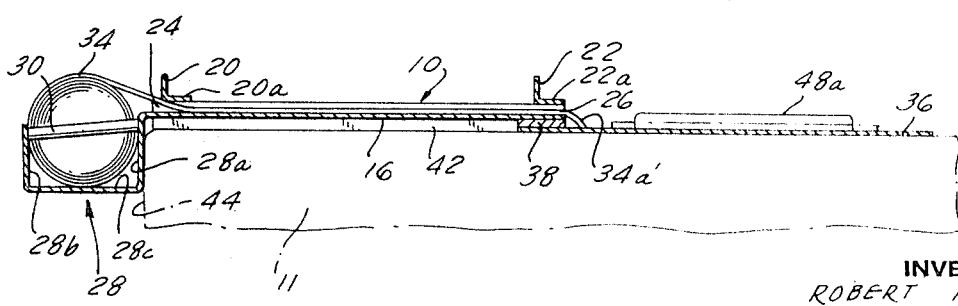
FIG. 3 is an enlarged section taken along line 3-3 of FIG. 2.

Referring in detail to the drawings, and particularly to FIGS. 1-3 thereof, there is shown film feed adapter apparatus 10 made in accordance with the invention and mounted on the feed deck 11 of an automatic film processing machine 12.

The automatic film processing machine 12 is of the conventional type presently in commercial use and is therefore not illustrated in detail. The machine 12 includes a pair of transverse rollers 13 located just inwardly of the feed deck 11, which rollers are power driven. A sheet of exposed, undeveloped, photographic film, typically 17 inches wide, is laid flat on the feed deck 11 and pushed inwardly into the machine, wherein the driven rollers 13 engage the film sheet and advance it through the various photographic processing steps along the course indicated by broken line 15 in FIG. 1. At various stages along this course of travel, additional pairs of driven rollers 13a engage and guide the film through the developing, washing and fixing baths contained within the machine. The film then travels through an internal drying section of the machine and emerges in finished condition from the outlet end 17 of the machine.

Because of the utilization of the spaced series of rollers 13 and 13a for advancing the film, the machine 12 is suitable only for the processing of single large sheets of film. It would be desirable to use such a machine for the processing of groups of smaller size roll films, fed simultaneously thereto, but hitherto this has been found impossible. Where groups of roll films are fed simultaneously at the feed deck of the machine, there is no provision for guiding the film accurately, and the driven rollers cause the roll films to skew and overlap, during transport through the machine, resulting in uneven development and ruined films. The film feed apparatus of the present invention enables a plurality of relatively narrow roll films to be fed simultaneously to the machine 12 and to be processed uniformly without such skewing and overlapping.

Film feed adapter 10 comprises a feed tray 14 including a flat shelf 16, upon the upper surface of which a plurality of spaced, parallel, longitudinally extending dividing ribs 18a are secured. The ribs 18a extend along the length of shelf 16 and divide the upper surface thereof into elongated longitudinal tracks 19, five of such tracks being illustrated in the embodiment shown in FIG. 2. A pair of end ribs 18b and 18c, of greater width but of substantially the same height and length as ribs 18a, are provided along the opposite side edges of shelf 16.

A pair of spaced crossbars 20 and 22, overlie the divider ribs 18a, 18b and 18c, at right angles thereto, and serve to hold the various roll filmstrips in flattened condition in the tracks 19 of the shelf 16. The crossbars 20 and 22 are each in the form of an L-shaped angle piece, and the crossbar 20 is located slightly inwardly of the front edge of shelf 16, with its bottom horizontal arm 20a fixedly secured to the upper surfaces of divider strips 18a, 18b and 18c, as shown in FIG. 3, thereby forming horizontally elongated feed openings 24 bounded by the bottom surface of arm 20a and the upper surface of shelf 16. Similarly, the crossbar 22 is located at the rear edge of shelf 16, with its bottom horizontal arm 22a secured to the upper surfaces of divider strips 18a, 18b and 18c to form above each track 19 feed opening 26. The thickness of divider strips 18a, 18b and 18c is such that the height of the openings 24 and 26, formed thereby, is sufficient to allow easily slidable passage of filmstrips therethrough in a manner to be presently described.

The front end portion of the shelf 16 is bent to form a U-shaped channel or trough 28 for receiving rolls of film to be developed. As shown in FIG. 3, this trough 28 has opposed end walls 28a and 28b which are located below the plane of shelf 16. As shown in FIG. 2, the trough 28 extends the width of the shelf 16 and is divided by a plurality of partition bars 30 into a plurality of compartments 32 for holding or separating individual rolls of film 34. The partition bars 30 are aligned with the respective divider ribs 18a, 18b and 18c so that the compartments 32 register with the respective tracks 19, and the film rolls 34 are guided accurately along the adapter 10 in evenly-spaced, parallel relationship.

A ledge 36 stepped down from the upper surface of shelf 16 extends horizontally outward from beneath the rear end of shelf 16, and is fixedly secured to underside of shelf 16 along its rear edge by means of a flat elongated spacer 38.

The top surface of feed deck 11 of processing machine 12 is provided with a raised platform 42 suitably dimensioned and situated on the upper surface thereof so that platform 42 conformably seats the underside of shelf 16 while wall 28a of trough 28 is located substantially parallel and in close proximity to the front sidewall 44 of feed deck 11, and the bottom surface of ledge 36 rests flush upon the upper surface of feed deck 11, as shown in FIG. 3. Thus, the film feed adapter 10 is immovably mounted on the feed deck 11 merely by laying it flat upon the top surface of said feed deck, in the manner shown in FIG. 3.

The film feed adapter 10 is made of a width which conforms to the width of the inlet opening of the machine 12 to be used. In the embodiment shown in FIG. 2, the five compartments 32 and the corresponding tracks 19 are made wide enough to receive rolls of film of various small sizes. In use of the adapter 10, after the latter has been mounted upon the feed deck 11 of the processing machine 12, in the manner previously described, a roll of film 34, withdrawn from its container or spool, is placed in each of the compartments 32. Each roll of film 34 is in the rolled up condition shown in FIG. 3, and is inserted in a compartment 32 so that it will unwind from the top with the curled lead end 34a thereof facing downwardly and toward the shelf 16. FIG. 2 shows, for purposes of illustration, two rolls 34 of 35mm. size film, contained within the first and fourth compartments 32, it being understood that ordinarily a film roll would be loaded into each of the compartments 32, and that rolls of larger size film can be so inserted for processing.

Each of the inserted rolls 34 is partially unwound and its lead end 34a is drawn through the opening 24 beneath the front crossbar 20. The lead end 34a is then drawn by hand across the upper surface of shelf 16 and inserted through the opening 26 beneath the rear crossbar 22. It will be appreciated, that when the roll film is advanced in this manner, it has a tendency to curl up and roll back toward the compartment 32. This tendency is advantageously utilized when the leading edge 34a of the film is drawn past the front crossbar 22 and then released. The leading edge of the film then curls downwardly about the rear edge of shelf 16 and the spacer member 38, engaging the upper surface of ledge 36, as shown by the lead edge 34a in FIG. 3. This normally curled condition of lead end 34a of the film, in combination with the overlying position of crossbar arm 22a and the downwardly stepped location of ledge 36, restrains the unwound portion of roll film 34 from slipping back through opening 26, and insures that this unwound film portion is held flat along the upper surface of shelf 16.

After all the rolls of film in each of the compartments 32 have been partially unwound and retained by their self-locking action in the manner just described, a carrier sheet 46 is placed upon the upper surface of ledge 36. The carrier sheet 46 is made of a flexible material, such as plastic, which is inert to the action of the processing chemicals in the machine 12, and is preferably made of the maximum width which will be received within the machine 12. The lead ends of all the rolls of film inserted in adapter 10 are to be attached to this carrier sheet in order to transport the plurality of strips of roll film through the processing machine 12 simultaneously and in spaced, parallel relationship.

FIG. 2 shows the lead end 34a'' of one of the film rolls 34 drawn over the upper surface of the carrier guide sheet 46 and attached thereto by a strip of adhesive tape 47. Each of the film rolls is successively attached to the sheet 46 by an adhesive strip in a similar manner, and the sheet 46 is then slid forwardly along the upper surface of ledge 36 until it enters the feed opening of machine 12 and is engaged by the first line of driven rollers 15 to be drawn into the machine 12 and along the processing path therein. The ledge 46 is provided with a pair of spaced, upstanding guide rails 48a and 48b which are located to engage the opposite sides of the carrier guide sheet 46 and guide the latter accurately and longitudinally into the inlet opening of machine 12.

As the carrier guide sheet 46 is drawn through the machine 12 with the attached filmstrips trailing, the filmstrips pass through the lines of rollers 15 without shifting laterally and remain spaced and parallel to each other during the entire processing operation.

Referring to FIG. 3, it will be noted that the length of the film rolls 34 that can be accommodated by the compartments 32 is limited by the depth and width of trough 28. Accordingly, referring to FIGS. 6—8, there is further provided a reel adapter 50 mounting a reel 52, which adapter 50 may be attached to trough 28, in order to allow rolls of film of greater length, e.g. up to about 100 feet, to be fed from reel 52 to processing machine 12.

Reel adapter 50 comprises an elongated, rectangular mounting arm 54 having adjacent one end thereof a transverse slot 56 extending between its opposite sidewalls 54a and 54b. The slot 56 extends from the bottom wall of arm 54 to a point above the center thereof and is sized to slidably receive front wall 28b of trough 28 in the manner shown in FIG. 8, for rigidly coupling arm 54 to feed tray 14, whereby arm 54 extends horizontally and rearwardly from trough 28.

A guide roller 58 is rotatably mounted on the reel adapter arm 54 at the same end thereof which contains slot 56. The guide roller 58 projects laterally outward from sidewall 54a and is positioned to guide the passage of filmstrip 34 from reel 52 through opening 24. A rotatable spindle 60 is also mounted on the arm 54 and projects from the sidewall 54a at the end portion thereof opposite the slot 56. The spindle 60 is sized to mount the reel 52, and is provided with a screw clamp 62 which is adjustably slidable thereon and secured in adjusted position to retain the reel 52 on spindle 60.

When the film feed adapter 10 is to be employed for feeding long lengths of film mounted on reels, a reel adapter 50 may be mounted in each of the roll film compartments 32. FIG. 7 shows, by way of illustration, two reel adapters 50 mounted in respective compartments 32, it being understood that ordinarily five reel adapters would be mounted in the five compartments. In order to mount a reel adapter 50, it is only necessary to place the adapter arm 54 on the trough front wall 28b with the latter extending into the slot 56, and press the arm 54 downwardly until the top edge of wall 28b engages the end of slot 56, in the manner shown in FIG. 8. Slot 56 is suitably dimensioned to receive wall 28b easily with a minimum of free play between the slot 56 and wall 28b, such that arm 54 will be firmly connected to trough 28 under the weight of arm 54 and reel 52 mounted thereon.

Each reel adapter 50 is thus mounted in one of the compartments 32, with the guide roller 58 centered within said compartment. When the adapters are so mounted, each reel 52 will be in alignment with a respective track 19 of the shelf 16. In preparing the film for processing, the lead end 34a of the film on each reel 52 is drawn from the reel, fed beneath the respective guide roller 58 and then through front feed opening 24 and rear feed opening 26, in the manner previously described, and finally attached to the carrier guide sheet 46 by adhesive strips 47. The carrier guide sheet 46 is then fed into the machine 12 and the filmstrips 34 are unwound from the respective reels 52 and drawn by guide sheet 46 through machine 12 in spaced, parallel alignment.

In order to prevent accidental disengagement of arm 54 from trough wall 28b, arm 54 may be provided with a lock 64 comprising a pin 66 fixedly secured to the underside of arm 54 and extending downwardly therefrom, and a retaining finger 68 turnably mounted on the free end of pin 66. Thus, when it is desired to engage or disengage arm 54 from trough 28, finger 68 is rotated to face the front of arm 54. When it is desired to lock arm 54 in the mounted position of FIG. 8, finger 68 is rotated to underlie the bottom wall 28c of trough 28 and thereby prevent upward movement of arm 54 with respect to sidewall 28b. Thus, inadvertent disengagement of reel adapter 50 from feed tray 14 is prevented.

The reel adapters 50 shown in FIG. 7 are illustrated as containing reels of film of 35mm. size. The adapters 50 may also mount reels of larger size film, such as 70mm. film, but in this instance, each adapter must be mounted in the compartment 32 next adjacent the track 19 through which the film is to be fed, so that only alternate tracks may be employed and only three film adapters 50 used.

While preferred embodiments of the invention have been shown and described herein, it is obvious that numerous omissions, changes and additions may be made in such embodiments without departing from the spirit and scope of the invention.

I claim:

1. Apparatus for feeding filmstrips to film processing equipment comprising a tray having its top surface divided into parallel tracks for slidable conveyance of filmstrip therealong from the front to the rear end of said tray, means for mounting said tray onto film processing equipment, filmstrip receptacle means at the front end of said tray and extending across the width thereof for receiving a plurality of filmstrips, carrier sheet means adaptable to have the leading ends of said filmstrips detachably secured thereto for simultaneously conveying said filmstrips respectively along said parallel tracks and through said film processing equipment in alignment with said tracks, and a ledge extending from the rear end of said tray, with the top surface of said ledge being stepped-down relative to the top surface of said tray.

2. Apparatus according to Claim 1 including a crossbar extending transversely over said tracks and parallel to the surface of said tracks at the rear end of said tray, said crossbar being spaced above said track surface to define a horizontally-elongated opening at the rear end of each of said tracks bounded by said crossbar and the track surface for guided slidable passage of said filmstrips therethrough.

3. Apparatus according to claim 2 including a further crossbar extending transversely over said tracks and parallel to the surface of said tracks at the front end of said tray adjacent said filmstrip receptacle means to define a horizontally-elongated opening at the front end of each of said tracks bounded by said further crossbar and said track surfaces for guided slidable passage of said filmstrips from said filmstrip receptacle means, through said front elongated opening, along said tracks, through said rear elongated opening and onto said ledge for attachment to said carrier sheet means.

4. Apparatus according to Claim 1 including a plurality of reel adapter means for feeding film strips from respective reels onto said tracks, said reel adapter means each comprising an arm having a rotatably mounted spindle extending laterally therefrom at the front end thereof for mounting a reel, said arm having coupling means at the rear end thereof for detachably and rigidly coupling said arm to said receptacle means.

5. Apparatus according to Claim 4 wherein said receptacle means comprises a trough divided along its length into a plurality of compartments respectively aligned with said tracks, said trough having a vertical rear wall extending from the front end of said tray and substantially perpendicular to said tray top surface, and a vertical front wall, said coupling means comprising an elongated slot in said arm extending perpendicularly to the longitudinal axis of said arm, said slot being suitably dimensioned to slidably receive said trough front wall, whereby said arm extends horizontally forwardly from said trough when said arm is coupled thereto and when said tray is mounted on said film processing equipment.

6. Apparatus according to Claim 5 including a guide roller rotatably mounted on and extending laterally from said arm and perpendicular thereto at the rear end of said arm adjacent said slot, whereby said guide roller extends transversely within a compartment when said reel adapter means is mounted on said trough.

7. Apparatus according to Claim 6 wherein said reel adapter means includes lock means for preventing inadvertent disengagement of said arm from said trough front wall, said lock means comprising a pin depending from the bottom edge of said arm at a point sightly forward of said slot, and a finger mounted on the free end of said pin for rotatable movement about the axis of said pin.